United States Patent [19]

Piehl et al.

[11] 4,205,050

[45] May 27, 1980

[54] METHOD OF REDUCING CORROSION IN SOUR GAS SWEETENING SYSTEMS

[75] Inventors: Robert L. Piehl, Napa; W. Bertram Scarborough, Lafayette, both of Calif.

[73] Assignee: Chevron Research Company, San Francisco, Calif.

[21] Appl. No.: 697,073

[22] Filed: Jun. 17, 1976

[51] Int. Cl.[2] .............................................. B01D 53/34
[52] U.S. Cl. .................................. 423/228; 423/229; 423/238
[58] Field of Search ........................ 423/228, 229, 238

[56] References Cited

U.S. PATENT DOCUMENTS 3,344,585 10/1967 Hollowell .................. 423/238 X 3,864,449 2/1975 Homberg et al. .................... 423/228

FOREIGN PATENT DOCUMENTS 909342 5/1946 France ...................... 423/229

Primary Examiner—Earl C. Thomas
Attorney, Agent, or Firm—D. A. Newell; R. H. Davies; D. L. Hagmann

[57] ABSTRACT

In a gas purification process wherein hydrogen sulfide is adsorbed by an alkanolamine solution in an absorption zone and desorbed in a regenerating column, the improvement comprising reducing corrosion in the overhead section of the column by introducing into the overhead section of the regenerating column an effective amount of ammonia scrubber bottoms liquid.

3 Claims, 1 Drawing Figure

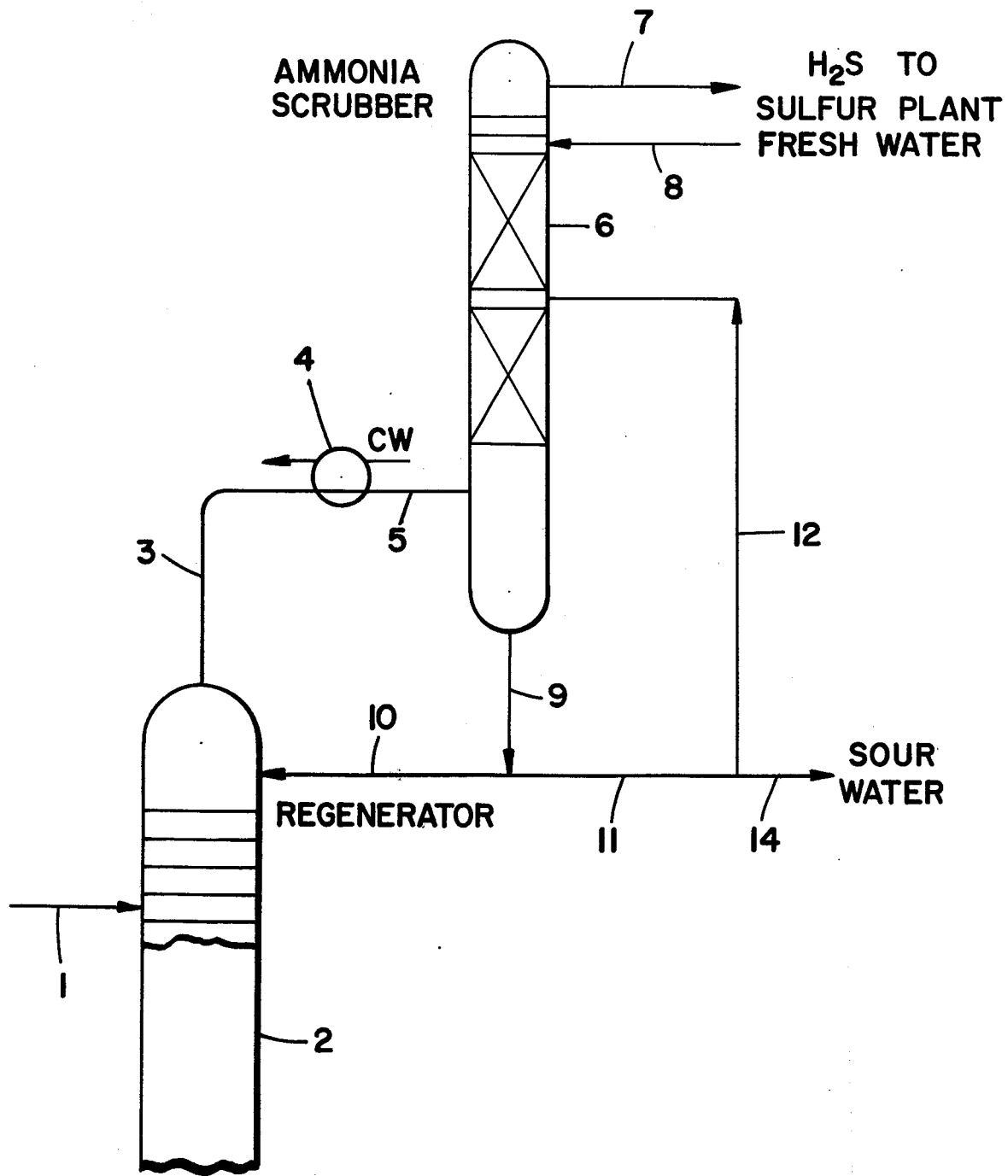

METHOD OF REDUCING CORROSION IN SOUR GAS SWEETENING SYSTEMS

BACKGROUND OF THE INVENTION

The present invention relates to a method for preventing or inhibiting corrosion in sour gas sweetening systems. More particularly, it is concerned with the reduction of corrosion occurring in the overhead system in an alkylolamine regeneration column by introducing an effective amount of ammonia scrubber bottoms liquid in the overhead system.

BACKGROUND

Absorption of acid constituents, such as hydrogen sulfide and carbon dioxide, from sour natural gas by the use of alkylolamines is a technique that has been known for many years. For example, see U.S. Pat. Nos. 2,718,454 and 3,518,048. Initially and over the years the use of alkylolamines and the regeneration thereof in sour gas sweetening systems has been plagued by numerous corrosion problems in various areas of the process system. One problem for which there remains a serious need for a satisfactory solution is corrosion in the overhead portion of the regenerating column. In this column, absorber solvent rich in absorbed acid gases, for example, hydrogen sulfide, is purged of its acid gas content and thereby is regenerated in a column containing refluxing liquids and vapors. Under conventional operating conditions the refluxing medium in the overhead section of the column builds up in materials, such as hydrogen cyanide, ammonium bisulfide and the like at pH and concentration levels which favor corrosion of the column. This corrosion problem is reviewed and considered in the article entitled "Refiners Face Corrosion Facts", Hydrogen Processing, April 1974, pp. 109-112, Frank L. Evans, Ed.

DESCRIPTION OF THE INVENTION

It has now been found that corrosion in the overhead section in an alkylolamine regeneration column is eliminated or effectively reduced by introducing into the overhead an effective amount of ammonia scrubber bottoms liquid.

The FIGURE is a schematic process flow diagram illustrating an embodiment of the invention.

The method of the invention is illustrated further by reference to the accompanying drawing wherein an aqueous diethanolamine (DEA) solution withdrawn from a conventional gas scrubber unit, not shown, and rich in hydrogen sulfide is introduced into regenerator column 2 via line 1. This stream contains both liquid and gas and is supplied to column 2 at an hourly rate of about 156 kg of DEA, 467 kg of water, 31 kg of hydrogen sulfide, 2.2 kg of carbon dioxide, 0.06 kg of ammonia and a trace of light hydrocarbons. Column 2 is operated at a pressure of between 14 and 20 psig and heated to a bottom temperature of about 115° C. by means of a reboiler, not shown. Overhead a stream comprising acid gases and water vapor is withdrawn through line 3 at a temperature of about 111° C. and a pressure of about 2.2 atmospheres (17 psig) and passed to overhead condenser 4 where it is cooled by indirect heat exchange to a temperature of about 49° C. Via line 5 the cooled stream is withdrawn from condenser 4 and passed to ammonia scrubber 6.

Scrubber 6 is operated under preferred ammonia scrubbing conditions, that is, at a bottoms temperature and pressure of 49° C. and 1.9 atmospheres (14 psig), respectively, and an overhead effluent stream temperature of about 43° C. Under these conditions, the overhead effluent stream withdrawn from scrubber 6 via line 7 contains on an hourly basis about 0.8 kg of water and 30.3 kg of hydrogen sulfide. This stream is particularly useful as a feed to a claus-type sulfur plant. Via line 8 about 30.8 kg per hour of water, fresh and/or recovered process water, for example, from a sour water stripper, at about 43° C. is introduced into the overhead section of scrubber 6. Via line 9 a bottoms stream is withdrawn from scrubber 6 at a rate of about 97.1 kg per hour of which about 96.5 kg is water, 0.4 kg is hydrogen sulfide and 0.2 kg is ammonia. Of the stream in line 9, about 36.4 kg per hour of water is passed via line 10 to the overhead section of diethanolamine regenerator column 2 and about 60.7 kg per hour is passed via line 11 for recycle in part (29.8 kg per hour) to scrubber 6 via line 12 and in part (29.8 kg per hour) for discharge from the system via line 14.

The introduction into regenerator 2 of the bottoms liquid from ammonia scrubber 6 results in a marked reduction in the corrosion which is normally experienced in the overhead section of the regenerator column where no introduction of ammonia scrubber bottoms liquid is made. This bottoms material contains for practical purposes none of the alkanolamine reagent used in the acid gas scrubbing or regenerating section of the process.

The use of aqueous alkanolamine scrubbing solutions for the removal of acid gases, for example, hydrogen sulfide, from a gaseous mixture and the regeneration of these solutions (see representative U.S. Pat. Nos. 2,600,328; 2,638,405; 2,701,750; 2,718,454; 2,776,870; 3,100,680; 3,245,752; 3,288,557; 3,266,866; 3,463,603; 3,622,267 and 3,864,449) is well known in the art and these operations of themselves do not constitute the present invention.

Ammonia scrubber operating conditions satisfactory for use herein vary, depending in the main upon the temperature and pressure of the overhead effluent gas stream which is withdrawn from the alkanolamine regenerator. Usually, satisfactory temperatures and pressures are in the range 20°-100° C. and 1-10 atmospheres.

The amount of the ammonia scrubber bottoms which should be introduced into the alkanolamine regenerator varies, depending in the main upon the build-up rate of the conditions responsible for the corrosion, pH, hydrogen cyanide concentration and the like. In any event, where an empirical test (for example, by the use of conventional corrosion test strips) shows a relatively high corrosion rate in the overhead section, a relatively larger amount of the ammonia scrubber bottoms liquid must be introduced into the overhead section of the alkanolamine regenerator in order to effectively displace and dilute out the corrosion producing conditions. In general, a satisfactory amount will be in the range from about 20 to 70, preferably about 30, percent of the bottoms effluent from the ammonia scrubber column.

What is claimed is:

1. In a process for the recovery of hydrogen sulfide from a gaseous mixture containing ammonia and said sulfide by contacting the mixture with an aqueous alkanolamine solution and recovering said hydrogen sulfide by passing the resulting hydrogen-sulfide-rich aqueous alkylolamine to an alkanolamine regenerating column operating under aqueous alkanolamine solution reflux conditions and withdrawing an overhead hydrogen-sulfide-rich stream from the overhead section of said regenerating column, the improvement comprising reducing corrosion in said section by steps including:

(i) passing said withdrawn overhead regenerating column stream to an ammonia scrubber column operating under ammonia scrubbing conditions;

(ii) withdrawing an overhead stream comprising hydrogen sulfide from said scrubber column;

(iii) withdrawing a bottoms stream comprising water from said scrubber column; and (iv) introducing a portion of said withdrawn bottoms stream into said overhead section of said regenerating column, said portion based upon the bottoms effluent from said scrubber column, being in the range from about 20 to 70 percent thereof.

2. A process as in claim 1 further characterized in that said portion is about 30 percent of said bottoms effluent.

3. In a process for the recovery of hydrogen sulfide from a first gaseous stream comprising hydrogen sulfide, a nitrogen compound selected from ammonia and ammonium sulfide, and at least one other gaseous material, which comprises scrubbing at least some of said hydrogen sulfide and said nitrogen compound from said first gaseous stream in a scrubbing zone with an aqueous alkanolamine, separately withdrawing from said scrubbing zone a second stream comprising at least a substantial portion of said other gaseous material, separately passing from said scrubbing zone to a separation column a third stream comprising the mixture of alkanolamine, hydrogen sulfide and nitrogen compound resulting from said scrubbing, separating alkanolamine from said third stream in said separation column, and withdrawing from an upper portion of said separation column a fourth stream substantially comprising hydrogen sulfide and ammonia, the method of reducing corrosion in said upper portion of said separation column which comprises:

(i) passing said fourth stream to an ammonia scrubber column;

(ii) scrubbing ammonia from said fourth stream in said scrubber column with water, thereby forming a mixture comprising ammonia and water;

(iii) withdrawing said mixture of ammonia and water from said scrubber column as a fifth stream;

(iv) withdrawing a sixth stream comprising hydrogen sulfide from said scrubber column; and (v) introducing 20 to 70 volume percent of said fifth stream into said upper portion of said separation column, whereby corrosion is reduced in said upper portion.

* * * * *